P. J. KELLY.
INTERNAL THREAD CUTTING TOOL.
APPLICATION FILED FEB. 24, 1917.
1,234,769.
Patented July 31, 1917.
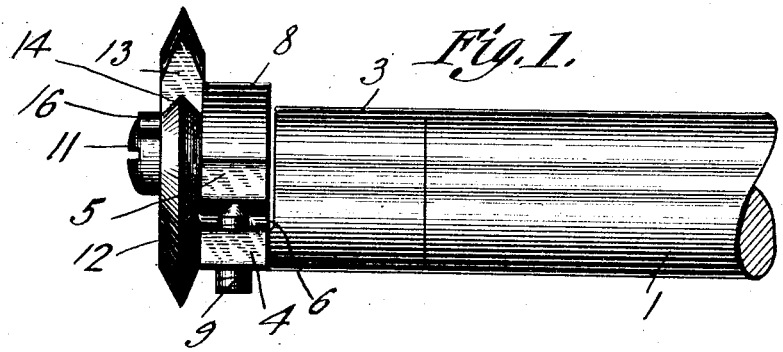
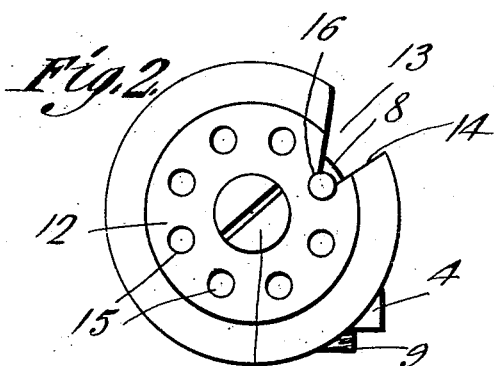
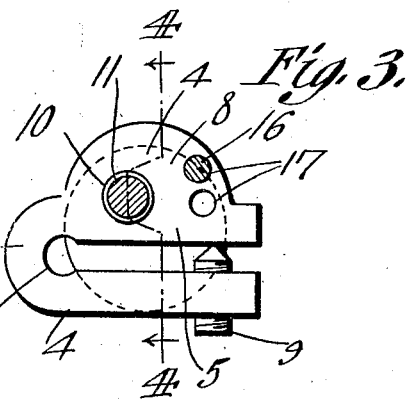
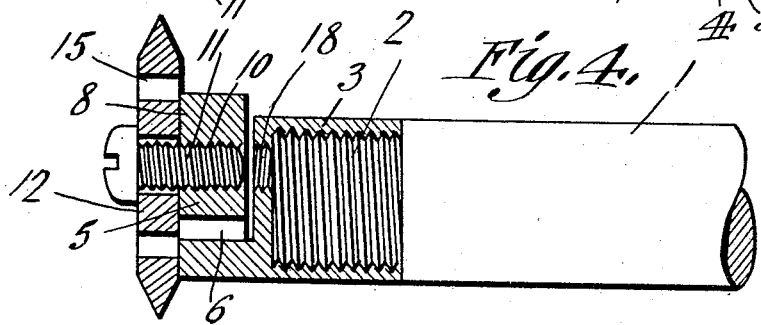
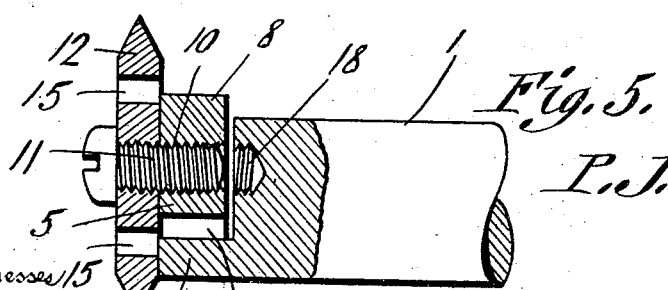
P. J. Kelly, Inventor

UNITED STATES PATENT OFFICE.

PATRICK J. KELLY, OF ELIZABETH, NEW JERSEY.

INTERNAL-THREAD-CUTTING TOOL.

1,234,769.  Specification of Letters Patent.  Patented July 31, 1917.

Application filed February 24, 1917. Serial No. 150,763.

*To all whom it may concern:*

Be it known that I, PATRICK J. KELLY, a citizen of the United States, residing at Elizabeth, in the county of Union and State of New Jersey, have invented a new and useful Internal-Thread-Cutting Tool, of which the following is a specification.

The present invention appertains generally to metal working implements, and relates more especially to a tool for chasing internal screw threads.

It is the object of the invention to provide an internal metal working or thread cutting tool provided with novel means for resiliently supporting the cutter within the work being acted upon.

It is also the object of the invention to provide an internal cutting tool having the foregoing features, and which at the same time, is extremely simple and inexpensive in construction, as well as compact, practical and efficient.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawing, wherein:—

Figure 1 is a side elevation of the improved tool, part of the shank being broken away.

Fig. 2 is an end view thereof.

Fig. 3 is an end view with the cutter removed and its screw and holding pin shown in section.

Fig. 4 is a longitudinal section taken on the line 4—4 of Fig. 3, the cutter being illustrated, and portions being shown in elevation.

Fig. 5 is a view similar to Fig. 4 showing a modification.

The tool embodies a shank 1 of circular or other suitable cross section and adapted to be supported by a suitable tool holder so that the shank projects into the stock or work being acted upon. As illustrated in Fig. 4, the end of the shank 1 is reduced and threaded, as at 2, and has a cap 3 threaded thereon. This construction is arbitrary however, since the cap 3 need not be used, as shown in Fig. 5, and in order that the description will refer to both forms of the invention, the cap 3 will be called the end of the shank 1, since it provides a removable end piece therefor.

The resilient tool supporting means embodies a transverse elongated member 4 extending in a chordal direction across the end of the cap 3 or shank 1 and integral therewith between the ends of said member. A resilient arm 5 extends across the end of the cap or shank adjacent to and substantially parallel with the member 4, and one end of the arm 5 is united with the corresponding end of the member 4, by means of a resilient arcuate yoke 6. There is a narrow slot between the member 4 and the arm 5 open at that end remote from the yoke 6, and provided with an enlarged opening or aperture 7 within said yoke, whereby to render the arm 5 of greater resiliency. This head of the tool, composed of the member 4 and arm 5, can be forged or otherwise manufactured with the arm 5 in alinement with the member 4, and said arm can then be bent or doubled over the member 4 to extend across the end of the shank. This arm 5 can spring toward and away from the member 4 in a plane substantially at right angles with the shank. The arm 5 is provided between its ends with an ear 8 projecting away from the member 4, and a stop screw 9 is threaded through the member 4 adjacent to its free end and projects toward the free end of the arm 5. When this screw 9 is screwed into contact with the arm 5, it will hold said arm rigid, and when the screw is retracted, the arm is permitted to spring toward the member 4, for yieldably supporting the tool which is carried by the arm 5. The member 4 and arm 5 constitute a U-shaped member having its arms extending across the end of the shank and spaced apart transversely, one arm being united rigidly with the end of the shank and the other arm being resilient, and carrying the tool.

The arm 5 and ear 8 are provided with a threaded aperture 10 into which a pivot and clamping screw 11 is threaded, and a disk-shaped cutter 12 is mounted for rotary adjustment upon the screw 11 and is clamped by said screw against the outer side of the ear 8, said disk-shaped cutter extending across and overlapping the outer sides of the arm 5 and member 4, to provide a compact arrangement. The cutter is in a plane at right angles with the shank, and is provided at one point of its margin with a recess 13 providing a cutting face or nose 14 to engage the interior of the stock or work for chasing a thread therein or the like. The cutter 12 has an annular series of apertures 15 for receiving a holding pin 16 that can be inserted in either one of a pair of apertures 17 with which the ear 8 is provided. As the cutting nose 14 is worn away, it can be filed around the margin of the cutter, and the cutter can be adjusted angularly by removing the pin 16 and inserting it in the apertures 15 in succession and the respective apertures 17. The cutter will therefore have a long life, since practically the entire marginal portion thereof can be utilized, the cutter being adjusted as necessary to bring the new nose into proper position. As illustrated, the aperture 10 is extended, as at 18, into the end of cap or shank, whereby if a longer screw 11 is used, the same can be threaded into the extended aperture 18 to assist in holding the arm 5 rigid, when this is preferred. The cutter 12 can be removed and replaced or used interchangeably with others. It will be noted that the head of the tool including the cutter is but of slightly larger transverse area than the cross section of the shank, so that the tool can be readily inserted into the stock or object to be acted on. The member 4 and arm 5 are disposed in a common plane at substantially right angles with the shank and the cutter is parallel with said plane, thus providing a very compact arrangement, and also enabling the arm 5 and cutter 12 to yield transversely of and at right angles with the axis of the shank.

Having thus described the invention, what is claimed as new is:—

1. A tool embodying a shank, a resilient arm connected rigidly thereto and extending across the end thereof to spring in a plane at an angle with the shank, and a cutter carried by said arm.

2. A tool embodying a shank, a U-shaped member having its arms extending across the end of the shank and spaced apart transversely, one arm being rigidly connected with the shank and the other arm being resilient, adjustable means for limiting the movement of the resilient arm toward the first mentioned arm, and a cutter carried by the resilient arm.

3. A tool embodying a shank, a resilient arm connected rigidly with the shank and extending across one end thereof to spring in a plane at substantially right angles with the shank, and a disk-shaped cutter carried for angular adjustment by the outer side of said arm in a plane at an angle with the shank and about an axis within the outline of the shank.

4. A tool embodying a shank, a member extending across and connected to the end thereof, a resilient arm connected at one end to one end of said member and extending across the end of the shank to spring in a plane at an angle with the shank to and from said member, said member and arm being spaced apart transversely, and a disk-shaped cutter carried for angular adjustment by the outer side of said arm in a plane at an angle with the shank and overlapping said arm and member.

In testimony that I claim the foregoing as my own, I have hereto affixed my signature in the presence of two witnesses.

PATRICK J. KELLY.

Witnesses:
EDWARD J. HIGGINS,
JOSEPH HINES.

Copies of this patent may be obtained for five cents each, by addressing the "Commissioner of Patents, Washington, D. C."